H. J. SCOTT.
ELASTIC OR PNEUMATIC TIRE FOR ROAD VEHICLES.
APPLICATION FILED NOV. 8, 1907.

905,239.

Patented Dec. 1, 1908.

WITNESSES
W. P. Burke
L. Hajek

INVENTOR
Henry John Scott

UNITED STATES PATENT OFFICE.

HENRY JOHN SCOTT, OF CLERKENWELL, LONDON, ENGLAND.

ELASTIC OR PNEUMATIC TIRE FOR ROAD-VEHICLES.

No. 905,239.

Specification of Letters Patent.

Patented Dec. 1, 1908.

Application filed November 8, 1907. Serial No. 401,285.

*To all whom it may concern:*

Be it known that I, HENRY JOHN SCOTT, a subject of the King of Great Britain and Ireland, residing at 2 Wilmington street, Clerkenwell, London, England, have invented a new and useful Improvement in Elastic or Pneumatic Tires for Road-Vehicles, of which the following is a full and complete specification.

The present invention relates to elastic or pneumatic tires for road vehicles, and has for its object preventing the skidding or side-slipping of such tires, particularly the skidding or side-slipping of pneumatic tires on wet and muddy or greasy roads.

This invention comprises certain improvements hereinafter more particularly described and claimed of that type of device which comprises a studded band or tread adapted to be placed over the cover of the tire or the tread of the tire cover itself is provided with studs. In such devices it has been usual to employ a plurality of metal studs or rivets the heads of which project from the tread of the tire and contact with the ground. These devices are successful in preventing skidding but the studs are rapidly worn away in use and it is extremely difficult to so fix them in position as to prevent them from being torn away, particularly through the heads of the studs catching upon projections such as tram rails. In order to overcome the latter objection the studs have been inserted within recesses formed in the tread of the tire so that the head of the stud or its equivalent is normally below the level of the tread, but such constructions probably owing to difficulties of manufacture are not commercially successful. Owing to the rapid wearing away of metallic studs it has been proposed to use in substitution thereof india rubber studs or projections formed on the tread in manufacture but these constructions are not as efficient in preventing skidding as metallic studs. To enable the studs to be replaced when worn detachable studs—both metal and rubber—have been proposed for use.

Now by the present invention all the various disadvantages and difficulties in manufacture incident to the hereinabove mentioned constructions are overcome and an efficient and durable non-skidding device results.

Figure 2:
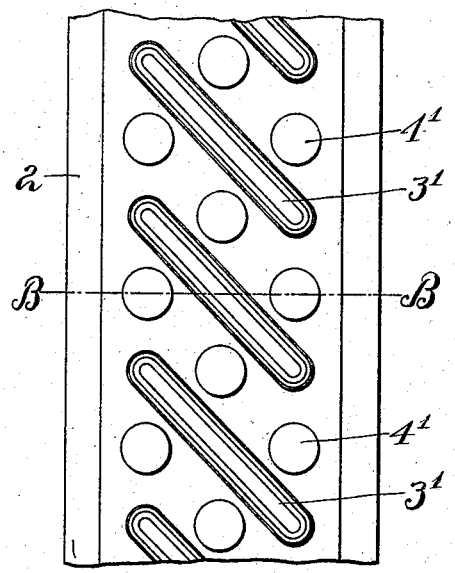
Figure 1:
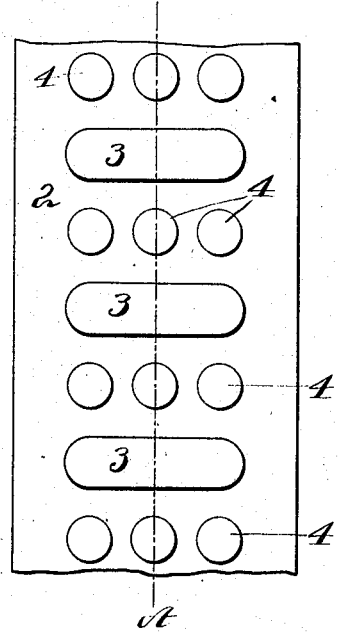
Figure 4:
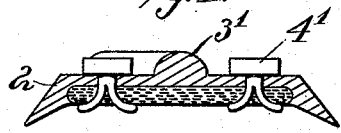
Figure 3:
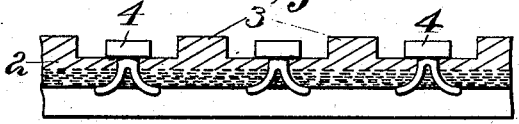

In the accompanying drawing, Figure 1 is a plan view of a portion of the tread of a tire constructed in accordance with my invention, and Fig. 2 is a similar view of a slightly modified form. Fig. 3 is a section on line A—A of Fig. 1, and Fig. 4 is a section of line B—B, Fig. 2.

Throughout the views similar parts are marked with like letters of reference.

The body of the band or tread is shown at 2 and this is provided with a plurality of integral india rubber projections 3 extending substantially from one side of the band to the other and arranged parallel to each other. Between the adjacent rubber projections are located a plurality of metal studs 4, the said studs being arranged in a row, the row extending like the rubber projection substantially from one side of the tread to the other, and thus the surface of the tire is provided with alternately arranged rubber ribs or projections 3 and rows of metal projections or studs 4. Instead of making the rubber projections and studs extend across the tread at right angles to the length thereof as shown in Fig. 1, they may be arranged diagonally as shown at 3' and 4' in Fig. 2.

What I claim, and desire to secure by Letters Patent is:—

A non-skidding band or tread for elastic or pneumatic tires for road vehicles having a plurality of integral india rubber projections and a plurality of parallel rows of metal studs, said rubber projections and each row of studs extending substantially from one side of the tread to the other and each row of studs being located between two of the projections.

HENRY JOHN SCOTT.

Witnesses:
G. V. SYMES,
WALTER TURNER.